United States Patent [19]

Herren

[11] Patent Number: 5,735,377

[45] Date of Patent: Apr. 7, 1998

[54] MODULAR IMPACT OR WEAR PADS

[76] Inventor: Harold Herren, 802 Main St., Platteville, Colo. 80651

[21] Appl. No.: 579,209

[22] Filed: Dec. 28, 1995

[51] Int. Cl.⁶ ............................................. B65G 11/16
[52] U.S. Cl. .............................. 193/33; 193/38; 198/771; 198/860.3
[58] Field of Search ............................ 193/2 R, 33, 38; 198/735.3, 860.3, 771

[56] References Cited

U.S. PATENT DOCUMENTS 5,055,336  10/1991  Davis .............................. 193/2 R

FOREIGN PATENT DOCUMENTS 2508593  8/1975  Germany ........................ 193/2 R
2107288  4/1983  United Kingdom ............... 193/33

*Primary Examiner*—Joseph E. Valenza
*Attorney, Agent, or Firm*—Dean P. Edmundson

[57] ABSTRACT

An impact or wear pad composed of a rubber or urethane sheet with one or more metal plates secured to one major surface. A threaded bolt is secured to each plate and extends outwardly from the rubber or urethane sheet at a right angle. The metal plates are vulcanized to the rubber sheet. The pad can be cut to any desired size or shape from a large sheet. The pad can be fastened to any desired surface by means of the bolts.

6 Claims, 5 Drawing Sheets

MODULAR IMPACT OR WEAR PADS

FIELD OF THE INVENTION

This invention relates to impact pads and wear pads which are typically used in rock and gravel handling apparatus such as hoppers, chutes, troughs, mills, vibrating screens, etc.

BACKGROUND OF THE INVENTION

Various types of material handling equipment include metal surfaces which are subject to excessive wear. For example, in rock and gravel handling apparatus, the movement of rocks and gravel against metal involves significant impact and friction which results in excessive wear. Although it has been known that rubber and urethane pads can be fastened to metal surfaces to protect the metal against abrasion and impact, there has not been provided an effective and efficient way to attach the rubber and urethane pads to the metal surfaces.

In one prior method, holes through the rubber pad must be preformed, and they must be formed in the exact location necessary to line up with the existing holes in the metal surface which is desired to be protected. This is cumbersome and does not allow for customization of the impact pad at the job site. Furthermore, placing bolts through pre-formed openings in the rubber pad leaves the heads exposed where they can be impacted by rocks or other materials. Even if the heads of the bolts are recessed slightly in the rubber, the heads can still be impacted by rocks or other materials.

Another prior system involves starting with a rubber or urethane roll or a flat sheet. The rolls are normally 2 feet to 4 feet wide and may be of any length. The flat sheets vary from 1 foot square to 5 feet wide and up to 10 feet long. If a steel backing is included it is usually about 18 gauge for field cutting.

The rubber or urethane is field cut to fit the area to be covered. Holes must be cut in the rubber or urethane and the steel areas to be covered. The holes are usually 6 to 12 inches apart. The holes in the rubber or urethane must align with the holes in the steel to be protected. A bolt and washer are placed on the top of the wear material so that the bolt will not pull through the rubber. Two wrenches must be used to secure the bolt and nut.

In another variation, holes are cut in the rubber material and in a length of steel strap (usually ⅛ inch×2 inches) corresponding with the holes in the rubber. The steel strap is then bolted down over the wear material to hold it down and prevent the wear material from flapping, tearing or ripping. The bolt heads are exposed to rocks and other material being handled. Therefore, the bolt heads usually wear out before the rubber or urethane. Replacement of the bolts is time-consuming and expensive.

When using steel backed rubber, the steel is light-weight (usually 18 to 20 gauge) and it is not strong enough by itself to support a bolt from collapsing the bolt hole. The light-weight steel can be field cut with difficulty. Self-tapping screws can be used to attach the wear material to the surface to be protected. It is also possible to use a Hilti nailer.

Counter-sinking a hole in rubber or urethane is complicated because a special tool must be used to make a proper sized tapered hole. The hole must be of the exact depth required and must be located in the proper position. The hole must not be too deep or there won't be enough material to support the bolt hole. If the hole is too shallow it causes a pocket which could promote the wear of the sheet adjacent the bolt head recess.

When the rubber or urethane is bolted down with a bolt and washer, there are various types of wear, e.g., crushing caused by heavy material, abrasion by particles sliding on the wear surface, and cuts made by material with sharp edges.

The steel areas to be protected in mining operations are screens that are used to segregate the rocks have a feed plate and discharge plate. These feed and discharge plates vary from four inches wide to 10 feet long. The bulk material drops onto both plates and travels across them in the screening operation. This causes severe wear and impact. The bulk material then travels from the screening area through routing chutes.

Heavy duty rubber sheets (0.5 to 2 inches or more) having a thick steel backing (0.125 or 0.25 inch) are sometimes used. The steel plate is either glued or vulcanized to the rubber. Normally four holes are punched in the plates (one hole in each corner). Holes in the rubber are cut 1.75 inch and are countersunk with a 0.625 hole in the steel to accommodate a 0.5 inch bolt.

The primary function of the steel backing plate is to support the bolt holes when fastening the material to a surface to be protected. It is normally not possible to use a light gauge steel because the bolt holes would collapse and the bolt head would pull through the hole. The steel in the screens and chute lines are normally 3/16 to ¼ inch in thickness. Holes are cut in the steel to correspond with the holes in the rubber (and backing plates) for installation.

A backing plate of 0.125 inch thickness with vulcanized rubber attached is very difficult to field cut to different dimensions. It is impossible to cut additional counter sunk holes in the rubber plate in the field.

The chute liners and wear areas often are not made in standard widths and lengths. Because of this, and the difficulty in field cutting the rubber plates and not having the holes line up, other methods of attachment must be used.

The rubber backup plates have to be custom made to fit these areas. The cost of custom made rubber plates in many situations is not cost effective.

It is possible to attach rubber impact pads to a surface with glue or adhesive, but this is cumbersome and time consuming. The area to be protected must first be thoroughly cleaned and dried. It must also be degreased. For rubber or steel primer to adhere properly, the surfaces must be buffed and sand blasted, or metal surfaces must be ground. The bonding is difficult to perform in the field because of dirt and dust in the environment. Also, when small sections wear out, it is difficult to replace these areas.

There has not heretofore been provided a simple and effective means for protecting wear areas from impact and abrasion.

SUMMARY OF THE PRESENT INVENTION

In accordance with the present invention there is provided an impact pad which can be very easily field cut and attached to a desired wear surface with bolts which are not exposed on the wear side of the pad. In one embodiment there is at least one metal plate adhered to a major surface of the rubber sheet and a threaded bolt member extends outwardly away from the metal plate. The bolt is secured to the metal plate and is perpendicular to it. The rubber sheet is vulcanized to the metal plate, and preferably the bolt extends through the metal plate. The bolt does not extend through the rubber sheet, however. Therefore, the bolt head is not exposed. This protects the bolt head from impact and abrasion when the impact pad is installed on a surface to be protected.

Preferably the metal plate used in the impact pad is light-weight (preferably 20 gauge or lighter) so that the pad can be cut or trimmed in the field very easily. By eliminating the use of heavy backing plates, much weight and cost is avoided. Also, the pad can be easily cut in the field with a hack saw or sabre saw to obtain exactly the size of pad needed.

In some applications, it is not necessary to use a continuous strip of metal backing on the pad. For example, where rigidity of the impact pad is not required, it is not necessary to use a continuous metal backing strip. In such applications, the bolts are secured in or to a small metal patch which is vulcanized on one surface to the impact or wear pad. Such pads can be easily cut or trimmed with a conventional utility knife.

Thus, the impact pad of the invention is very versatile and can be custom-fitted to any desired size or shape. Installation of the impact pad is simple, and the pad can be provided in any desired thickness. The bolt heads are fully protected from impact and wear.

Other advantages and features of the impact pad of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
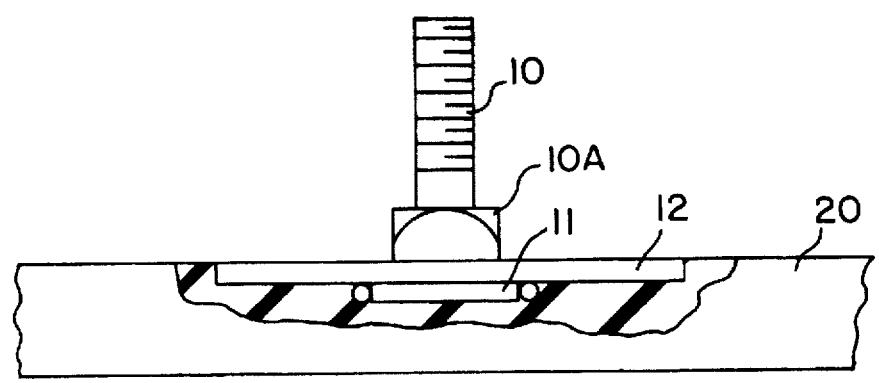
FIG. 1 is a side elevational, partially-cut-away view of an impact pad of the invention.

In FIG. 1 there is shown a threaded bolt 10 having an enlarged head member 11 and a square shoulder 10A near the head. The bolt extends through an opening or aperture in a metal plate 12. The opening is preferably square and is sized to receive and closely engage the square shoulder 10A of the bolt. The head of the bolt is also preferably tack welded to the metal plate at 13.

The impact pads can be made in any size. Useful sizes are normally in the range of about 6 inches×12 inches up to about 48 inches×48 inches. The thickness of the pad may vary from about ⅛ inch up to about 3 inches.

The metal backing plate on the pad may be continuous or discontinuous. If the metal backing plate is continuous, it may be of the same dimensions as the pad. Alternatively, the metal backing plate can be of smaller dimension and several parallel plates could be used on a single pad. As another alternative, each bolt can be secured in or to a small metal patch which is vulcanized on one face to the pad. The size of the patch may vary, e.g., from about 2 inches by 2 inches up to about 3 inches by 3 inches, depending upon the size of the bolt and the thickness of the metal patch (i.e., so that the patch does not pucker or cave when the bolt is tightened).

Figure 2:
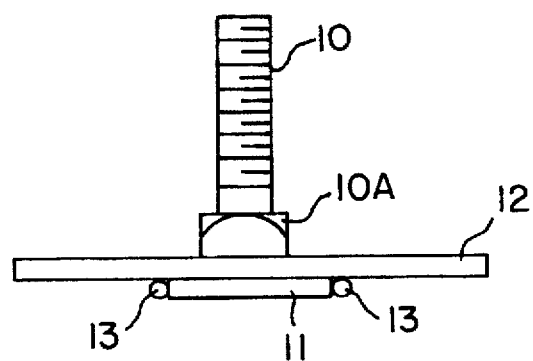
FIG. 2 is a side elevational view of a metal sheet with a bolt secured to it for use in the invention.

The metal plate, with bolt secured therein, is vulcanized to one major surface of a rubber (or urethane) pad or sheet 20, as shown in FIG. 2. The metal plate can be quite thin because the bolt head and one face of the plate is vulcanized to the pad for increased strength. Thus, this eliminates the need to use heavy metal backing plates. For use in this invention, the metal plate can be as thin as about 0.06 inch. If it is desired to increase the rigidity of the pad system, a thicker support plate can be used in combination with the pad and can then be re-used whenever a new impact or wear pad is required.

Depending upon the size of the impact pad, the spacing between the bolts in the pad will typically be about 6 inches although more bolts could be used if desired.

Figure 3:
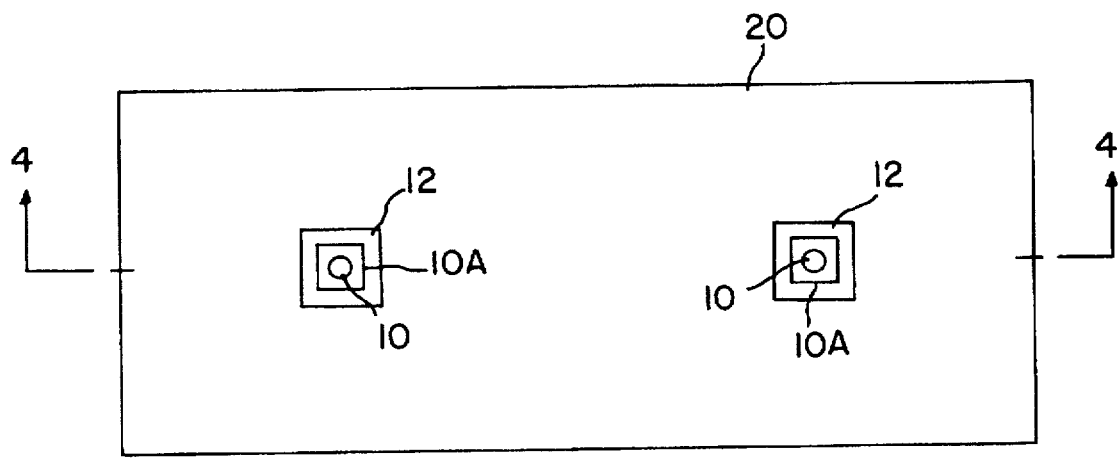
FIG. 3 is a rear elevational view of one embodiment of impact pad of the invention.

As shown in FIG. 3, one impact pad of the invention typically has a plurality of spaced-apart metal plates 12 secured thereto.

Figure 4:
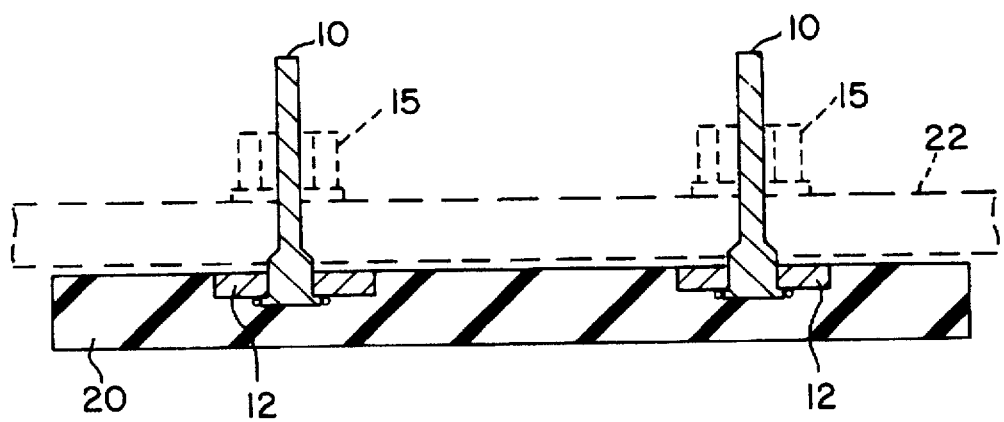
FIG. 4 is a cross-sectional view of the impact pad of FIG. 3 taken along line 4—4.

FIG. 4 is a cross-sectional view of the impact pad shown in FIG. 3. The dotted lines 22 show a metal surface to be protected by the pad. The bolts 10 extend through openings in the metal chute or metal surface 22 to be protected, and nuts 15 on the threaded bolts hold the impact pad securely in place.

Figure 5:
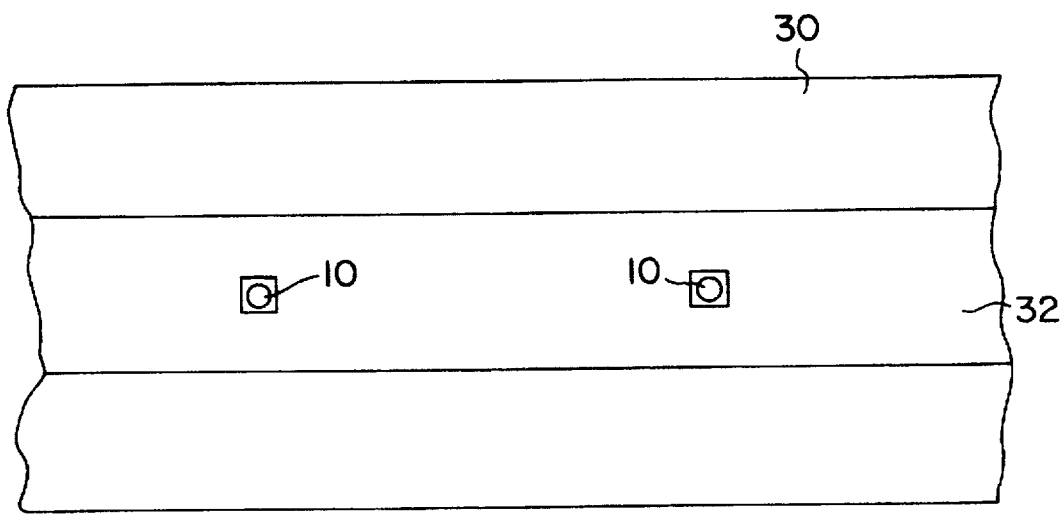
FIG. 5 is a rear elevational view of another embodiment of impact pad of the invention.

FIG. 5 is a rear elevational view of another embodiment of impact pad of the invention comprising a rubber pad 30 with an elongated metal plate 32 secured to one face of the rubber pad. The metal plate extends along the full length of the pad. A number of bolts 10 extend through spaced openings in the metal plate and are secured thereto in a manner similar to that shown in FIG. 1. The width of the metal plate is much less than the width of the rubber pad. The bolt can include a square shoulder to fit into a square hole in the metal plate, but this is not required.

Figure 6:
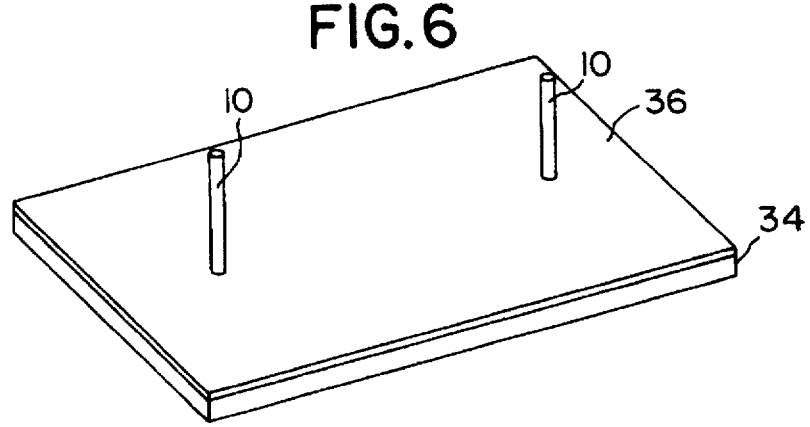
FIG. 6 is a perspective view of another embodiment of impact pad of the invention.
Figure 7:
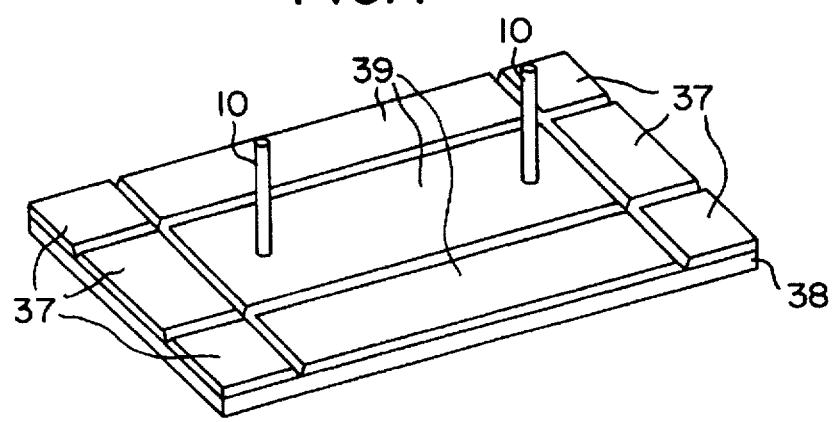
FIG. 7 is a perspective view of another embodiment of impact pad of the invention.

FIG. 6 is a perspective view of another embodiment of impact pad of the invention comprising a rubber or urethane pad 34 which has a thin metal plate 36 vulcanized to one face of pad 34. The plate is of the same width and length as the pad FIG. 7 is a perspective view of another embodiment of impact pad of the invention comprising a rubber or urethane pad 38 which has a plurality of thin metal plates 37 and 39 vulcanized to one face of pad 38. There is a small gap or space between adjacent metal plates. The impact pad can be cut or trimmed easily with a utility knife without having to cut any metal.

Figure 8:
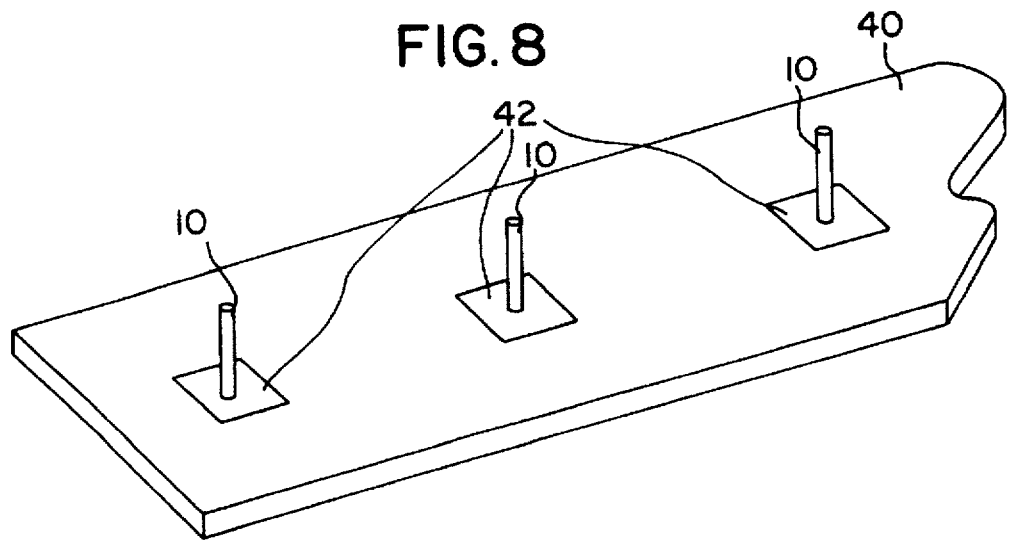
FIG. 8 is a perspective view of another embodiment of impact pad of the invention.

FIG. 8 is a perspective view of another embodiment of impact pad of the invention comprising a rubber or urethane pad 40 to which a plurality of small individual metal plates or patches 42 have been vulcanized. A bolt 10 is secured to, and extends through, each plate 42. This pad can also be easily trimmed to any desired size with a utility knife.

Figure 9:
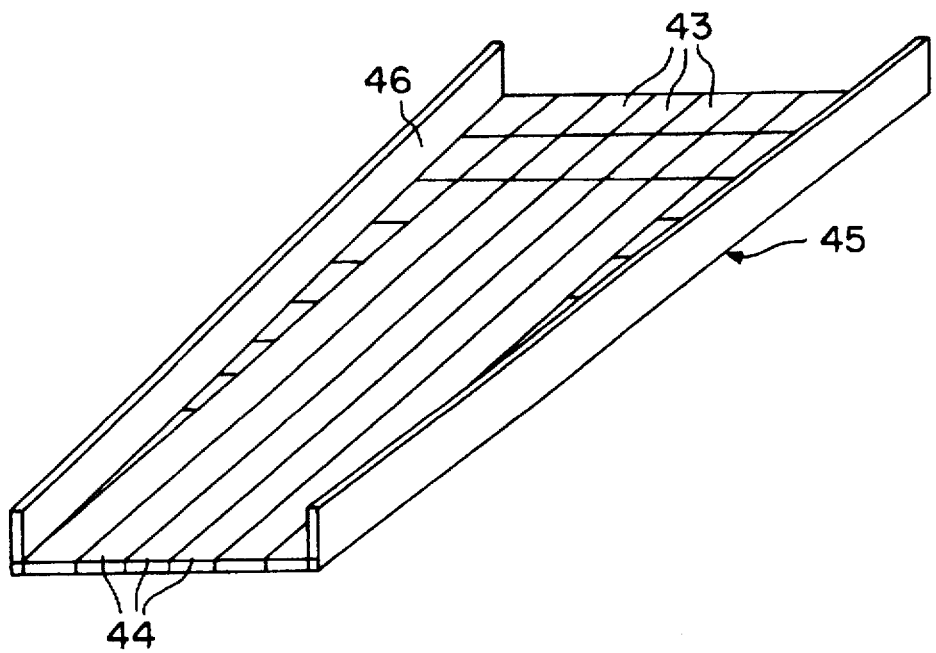
FIG. 9 is a perspective view of a chute whose interior surfaces have been covered with impact pads of the invention.

FIG. 9 shows a material chute 45 whose interior surfaces have been covered with a plurality of impact pads of the invention. As illustrated in the drawing, impact pads of various sizes can be used, e.g., pads 43, 44, and 46.

Figure 10:
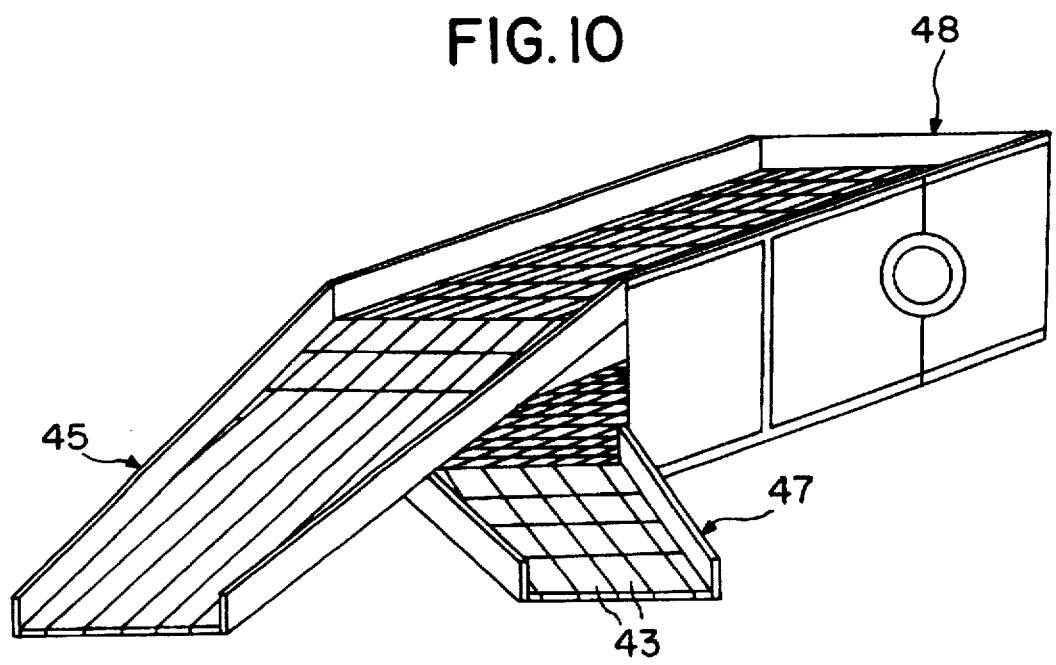
FIG. 10 is a perspective view of a screen deck which includes two chutes whose interior surfaces have been covered with impact pads of the invention.

FIG. 10 shows a portion of a screen deck 48 which includes material chutes 45 and 47. The interior surfaces of the chutes include a plurality of impact pads, as shown. When one or more impact pads become too worn, it is only necessary to loosen the bolts securing the worn pads and remove the pads. Then new pads can be installed only where necessary on the chute. The pads can be easily trimmed in the field before they are installed, if necessary.

Other variants are possible without departing from the scope of the invention. Because it is not necessary for heavy metal plates to be used on the back side of the rubber or urethane, and because it is not necessary for the metal plate to cover the entire back side of the pad, the pad can be easily trimmed or cut in the field to obtain the desired size or shape for any desired application.

What is claimed is:

1. An impact pad comprising a rubber sheet having first and second major surfaces, a plurality of metal plates secured to said first major surface of said rubber sheet, and a threaded bolt member extending outwardly away from each said metal plate; wherein each said bolt member is secured to a respective one of said metal plates and is perpendicular thereto.

2. An impact pad in accordance with claim 1, wherein each said metal plate is vulcanized to said rubber sheet.

3. An impact pad in accordance with claim 1, wherein each said bolt member extends through a respective metal plate.

4. An impact pad in accordance with claim 3, wherein each said bolt member includes a head portion which is secured to a respective metal plate.

5. An impact pad in accordance with claim 1, wherein each said metal plate has a thickness less than the thickness of said rubber sheet.

6. An impact pad in accordance with claim 3, wherein each said metal plate includes a square opening therethrough, and wherein each said bolt member includes a square shoulder sized to be closely received in said square opening of a respective metal plate.

* * * * *